(12) United States Patent
Imai et al.

(10) Patent No.: US 7,603,480 B2
(45) Date of Patent: Oct. 13, 2009

(54) SYSTEM USING PSEUDO REDUNDANT CONFIGURATOR TO SWITCH NETWORK DEVICES BETWEEN OPERATING AND STANDBY STATES

(75) Inventors: Tetsuo Imai, Tokyo (JP); Soichiro Araki, Tokyo (JP); Tomoyoshi Sugawara, Tokyo (JP); Norito Fujita, Tokyo (JP)

(73) Assignee: NEC Corporation, Tokyo (JP)

( * ) Notice: Subject to any disclaimer, the term of this patent is extended or adjusted under 35 U.S.C. 154(b) by 393 days.

(21) Appl. No.: 11/575,123

(22) PCT Filed: Aug. 29, 2005

(86) PCT No.: PCT/JP2005/015644

§ 371 (c)(1), (2), (4) Date: Mar. 12, 2007

(87) PCT Pub. No.: WO2006/030623

PCT Pub. Date: Mar. 23, 2006

(65) Prior Publication Data

US 2008/0034112 A1 Feb. 7, 2008

(30) Foreign Application Priority Data

Sep. 16, 2004 (JP) .............................. 2004-269817

(51) Int. Cl.
*G06F 15/173* (2006.01)
(52) U.S. Cl. .................. 709/239; 709/238; 370/216; 370/217
(58) Field of Classification Search ................ 709/238, 709/239, 240, 241, 242, 243, 244; 370/216, 370/217, 218, 219, 220, 225, 226, 227, 228; 713/201; 714/4
See application file for complete search history.

(56) References Cited

U.S. PATENT DOCUMENTS

| 7,178,052 | B2 * | 2/2007 | Hebbar et al. .................. 714/4 |
| 7,486,611 | B1 * | 2/2009 | Wilson ...................... 370/220 |
| 2003/0131262 | A1 * | 7/2003 | Goddard ..................... 713/201 |
| 2003/0189898 | A1 * | 10/2003 | Frick et al. .................. 370/227 |
| 2004/0047286 | A1 * | 3/2004 | Larsen et al. ............... 370/216 |
| 2004/0190442 | A1 * | 9/2004 | Lee .......................... 370/217 |
| 2004/0257982 | A1 * | 12/2004 | Boll et al. ................... 370/217 |
| 2005/0078600 | A1 * | 4/2005 | Rusmisel et al. ............ 370/217 |

(Continued)

FOREIGN PATENT DOCUMENTS

JP 10-65725 3/1998

(Continued)

*Primary Examiner*—Le Luu
(74) *Attorney, Agent, or Firm*—Dickstein Shapiro LLP

(57) ABSTRACT

Disclosed is a network system comprising: a plurality of routers 704 and 705 connected to each other through a network; pseudo redundant configuration setting means 702 and 703 which are connected respectively to the routers and which perform a communication using a redundancy protocol with respective routers; and association control means 701 connected to the pseudo redundant configuration setting means 702 and 703, wherein when a server 716 is a backup server and its backup state needs to be maintained, the pseudo redundant configuration setting means 703 issues a signal for maintaining a standby state to the router 705, and when servers are switched between a standby state and operating state, the association control means 701 transmits a switching instruction for switching between a standby state and operating state to the pseudo redundant configuration setting means 702 and 703.

6 Claims, 18 Drawing Sheets

U.S. PATENT DOCUMENTS

2005/0281194 A1* 12/2005 Sonoda ............... 370/220

FOREIGN PATENT DOCUMENTS

| JP | 10-214391 | 8/1998 |
| JP | 2002-312189 | 10/2002 |
| JP | 2003-51835 | 2/2003 |
| JP | 2003-258843 | 9/2003 |
| JP | 2004-80217 | 3/2004 |
| JP | 2004-146989 | 5/2004 |

* cited by examiner

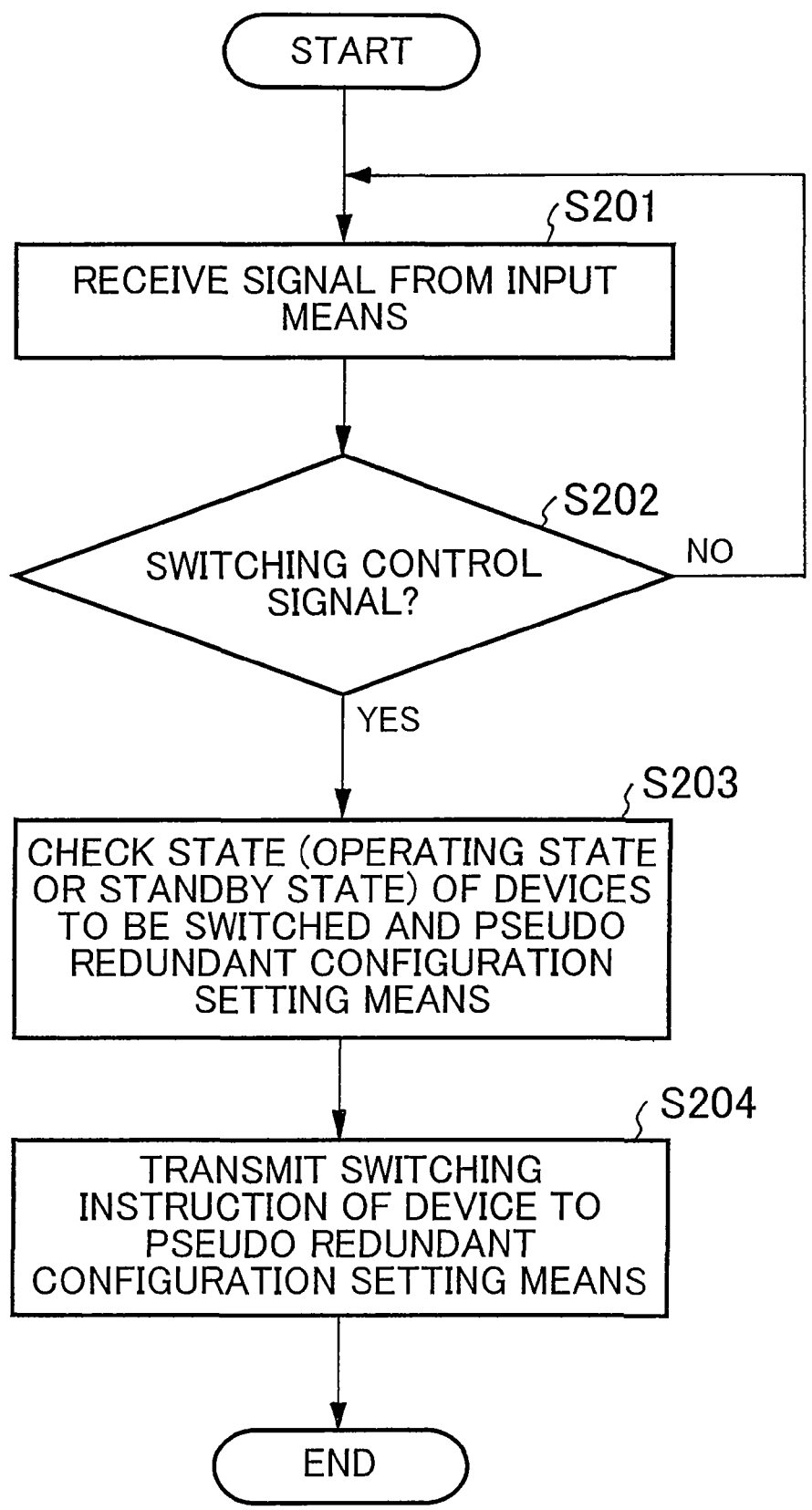

SYSTEM USING PSEUDO REDUNDANT CONFIGURATOR TO SWITCH NETWORK DEVICES BETWEEN OPERATING AND STANDBY STATES

TECHNICAL FIELD

The present invention relates to a destination switching technique applied to a communication system in which communication is performed by sending a signal such as a packet destined for a destination identifier that represents the destination, such as IP (Internet Protocol) address. The destination switching technique renames the destination identifier among a plurality of devices connected to a network to allow a user to switch an actual destination device from one device to another without changing the destination identifier that represents the destination device.

BACKGROUND ART

In general, a network device performs a communication by sending a signal such as a packet destined to a destination identifier that represents the destination, such as IP address. When one destination identifier is renamed among a plurality of devices connected to a network, a signal that is supposed to be sent to a given device is sent to another device. Thus, it is possible for a sender to change a destination device without changing the destination identifier. The technique for realizing this is hereinafter referred to as destination switching technique.

Further, as a technique to continue processing even when failures occur in a network device such as a router, there is available a redundancy technique that uses a redundancy protocol such as Virtual Router Redundancy Protocol (VRRP), HSRP (Hot Standby Router Protocol), or ESRP (Extreme Standby Router Protocol) which are specified in RFC2338.

In this technique, a plurality of devices having the same level capability are previously prepared, in which one device is set in an operating state and the other device in a standby state. When the device being in an operating state fails to operate for any reason such as failures, the device being in a standby state detects that and automatically switches its own state from standby-state to operating state. As a result, operation continuity can be secured.

Generally, in a redundancy protocol such as VRRP, a signal called "heartbeat" is periodically (every one second, in the default setting of VRRP) sent from a device in an operating state to a device in a standby state to notify that the device in an operating state performs normal operation. The device in a standby state always waits for the heartbeat to be sent from the device in an operating state. When the interval between the heartbeats becomes longer than a predetermined threshold, the device in a standby state determines that the device in an operating state cannot perform normal operation and switches its own state from standby state to operating state.

Simultaneously with the switching between the device in an operating state and device in a standby state, a switching of authority to receive a signal destined to a destination identifier, which is shared among the devices in a redundant configuration, is made among the devices. This configuration realizes the switching of devices to perform processing while maintaining a state where a user always connects to the same virtual destination identifier.

Techniques related to the present invention will be described. Patent Document 1 discloses a technique that monitors a state of WAN (Wide Area Network) using a network monitoring unit and issues a VRRP packet of priority of when failures occur to switch a MASTER device. In this technique, although the switching of a MASTER device is made intentionally by an external instruction, the switching is also made automatically when failures occur in a router itself. Further, in this technique, a function executed at the time of failures is newly added to the VRRP, so that it is necessary to modify the router configuration.

Patent Document 2 discloses that a technique such as a remote mirror is used to enable issuance of the heartbeat through a path different from normally used to thereby realize the redundant configuration of the heartbeat. Patent Document 3 discloses a technique that includes a redundancy alternative port for a communication among a plurality of routers and transfers an advertisement packet on a path through the redundancy alternative port at the time of disconnection fault of a line connected to a router. Patent Document 4 discloses a technique that continues issuing an alarm signal using a pseudo alarm unit to a system that automatically shifts to a standby mode in the time zone when there is no alarm to thereby maintain a normal mode even after an actual alarm has been stopped.

Patent Document 1: Jpn. Pat. Appln. Laid-Open Publication No. 2003-258843
Patent Document 2: Jpn. Pat. Appln. Laid-Open Publication No. 2002-312189
Patent Document 3: Jpn. Pat. Appln. Laid-Open Publication No. 2003-051835
Patent Document 4: Jpn. Pat. Appln. Laid-Open Publication No. 10-214391

DISCLOSURE OF THE INVENTION

Problem to be Solved by the Invention

In the destination switching technique that allows a user to change an actual destination device among a plurality of devices connected to a network, it is desirable to dynamically perform, at an administrator's intended timing, a switching of the authority to receive a signal destined to a given destination identifier among a plurality of devices connected to a network without adding any special modification to the devices.

Further, it is desirable to prevent, as much as possible, unintended occurrence of an automatic switching which tends to occur when a redundancy protocol is used to perform the destination switching.

Means for Solving the Problem

In the present invention, a redundancy protocol is used for realizing the destination switching technique. The redundancy protocol realizes a switching of the shared authority to receive a signal destined to a destination identifier at the time when a switching of the roles between device in an operating state and device in a standby state is made, to thereby realize a change of the destination identifiers. Further, the redundancy protocol is not only specified as a standard by a standard setting organization, but also so popular that many devices have already implemented the redundancy protocol. Thus, it is not necessary to add a new modification to the devices.

Further, in the present invention, a redundant configuration realized by use of the redundancy protocol is not set directly among devices, but a pseudo redundant configuration setting means that acts as a redundancy device is provided among the devices and a redundant configuration is established between a device to be switched and the pseudo redundant configuration setting means. With this configuration, at the time when the switching is intentionally made by an administrator, switching operations of standby state and operating state in respective devices are generated in association with each other to virtually set a redundant configuration between the devices to be switched. In the case where an automatic switching is generated based on a normal function of the redundancy protocol, switching operations of standby state and operating state in respective devices are not associated with each other to thereby prevent unintended occurrence of an automatic switching of a destination.

According to a first aspect of the present invention, there is provided a method of switching between network connection devices provided in a network system, the network system including: a plurality of devices to be switched connected to each other through a network; a plurality of pseudo redundant configuration setting means, each of which or several of which are connected respectively to one device to be switched and which perform a communication using a redundancy protocol with respective devices to be switched; and an association control means connected to the plurality of pseudo redundant configuration setting means, wherein when at least one of the plurality of devices to be switched is being in a standby state and this standby state needs to be maintained, the pseudo redundant configuration setting means connected at least to one device to be switched issues a signal for maintaining a standby state to the device to be switched being in a standby state, when the plurality of devices to be switched are switched between a standby state and operating state, the association control means transmits a switching instruction for switching between a standby state and operating state to the pseudo redundant configuration setting means connected to the device to be switched being in a standby state and pseudo redundant configuration setting means connected to the device to be switched being in an operating state, the pseudo redundant configuration setting means connected to the device to be switched being in a standby state transmits, in response to the switching instruction, information for switching to an operating state to the device to be switched being in a standby state, and the pseudo redundant configuration setting means connected to the device to be switched being in an operating state transmits, in response to the switching instruction, information for switching to a standby state to the device to be switched being in an operating state.

According to a second aspect of the present invention, there is provided a network system comprising: a plurality of devices to be switched connected to each other through a network; a plurality of pseudo redundant configuration setting means, each of which or several of which are connected respectively to one device to be switched and which perform a communication using a redundancy protocol with respective devices to be switched; and an association control means connected to the plurality of pseudo redundant configuration setting means, wherein when a device to be switched connected to the pseudo redundant configuration setting means is being in a standby state and this standby state needs to be maintained, the pseudo redundant configuration setting means issues a signal for maintaining a standby state to the device to be switched, when devices to be switched are switched between a standby state and operating state, the association control means transmits a switching instruction for switching between a standby state and operating state to the pseudo redundant configuration setting means connected to the device to be switched being in a standby state and pseudo redundant configuration setting means connected to the device to be switched being in an operating state, the pseudo redundant configuration setting means connected to the device to be switched being in a standby state transmits, in response to the switching instruction, information for switching to an operating state to the device to be switched being in a standby state, and the pseudo redundant configuration setting means connected to the device to be switched being in an operating state transmits, in response to the switching instruction, information for switching to a standby state to the device to be switched being in an operating state.

According to a third aspect of the present invention, there is provided a association control unit used in a network system including: a plurality of devices to be switched connected to each other through a network; and a plurality of pseudo redundant configuration setting means, each of which or several of which are connected respectively to one device to be switched, which perform a communication using a redundancy protocol with respective devices to be switched, and which issues a signal for maintaining a standby state to a device to be switched when the device to be switched connected to the pseudo redundant configuration setting means is being in a standby state and this standby state needs to be maintained, the association control means being connected to the plurality of pseudo redundant configuration setting means, wherein when receiving a control signal for switching between an operating state and standby state of the devices to be switched, the association control unit transmits a switching instruction for switching between a standby state and operating state to the pseudo redundant configuration setting means connected to the device to be switched being in a standby state and pseudo redundant configuration setting means connected to the device to be switched being in an operating state.

According to a fourth aspect of the present invention, there is provided a program allowing a computer for association control to execute processing, the computer being used in a network system including: a plurality of devices to be switched connected to each other through a network; and a plurality of pseudo redundant configuration setting means, each of which or several of which are connected respectively to one device to be switched, which perform a communication using a redundancy protocol with respective devices to be switched, and which issues a signal for maintaining a standby state to a device to be switched when the device to be switched connected to the pseudo redundant configuration setting means is being in a standby state and this standby state needs to be maintained, and the computer being connected to the plurality of pseudo redundant configuration setting means, the processing comprising: transmitting, when receiving a control signal for switching between an operating state and standby state of the devices to be switched, a switching instruction for switching between a standby state and operating state to the pseudo redundant configuration setting means connected to the device to be switched being in a standby state and pseudo redundant configuration setting means connected to the device to be switched being in an operating state based on information related to the plurality of devices to be switched and plurality of pseudo redundant configuration setting means which are stored in a storage section of the computer.

EFFECTS OF THE INVENTION

According to the present invention, it is possible to perform switching of devices to be accessed without modifying the devices.

This is because that a redundancy protocol that has been already implemented in many devices is used as a destination switching technique.

Further, even if failures occur in communication paths each connecting the association control means and pseudo redundant configuration setting means, a device to be accessed is not automatically changed.

This is because that a redundant configuration is established respectively between devices to be switched and corresponding pseudo redundant configuration setting means. Thus, even if failures occur in communication paths each connecting the association control means and pseudo redundant configuration setting means, respective pseudo redundant configuration setting means continue performing normal operation.

BRIEF DESCRIPTION OF THE DRAWINGS

[FIG. 18] A flowchart showing operation of the association control means

EXPLANATION OF REFERENCE CODE

Figure 1:
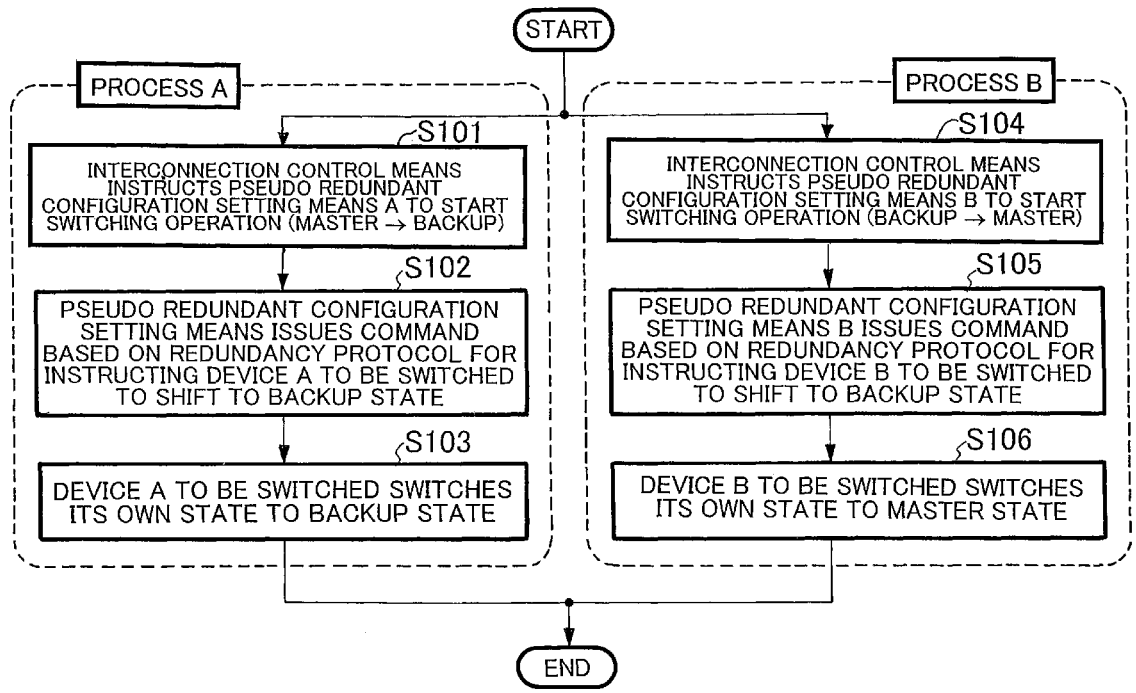
[FIG. 1] A view for explaining operation of a switching method between network connection devices according to the present invention

401: Association control means
402: Pseudo redundant configuration setting means
403: Pseudo redundant configuration setting means
404: Device to be switched
405: Device to be switched
406: Dedicated network
407: Network
408: Network
701: Association control means
702: Pseudo redundant configuration setting means
703: Pseudo redundant configuration setting means
704: Router
705: Router
706: Control network
707: VLAN for heartbeat
708: VLAN for heartbeat
709: Input means
710: VLAN for user
711: User terminal
712: Router
713: Destination switching unit
714: Destination switching unit
715: Main server
716: Backup server
716: Association control unit

BEST MODE FOR CARRYING OUT THE INVENTION

Figure 2:
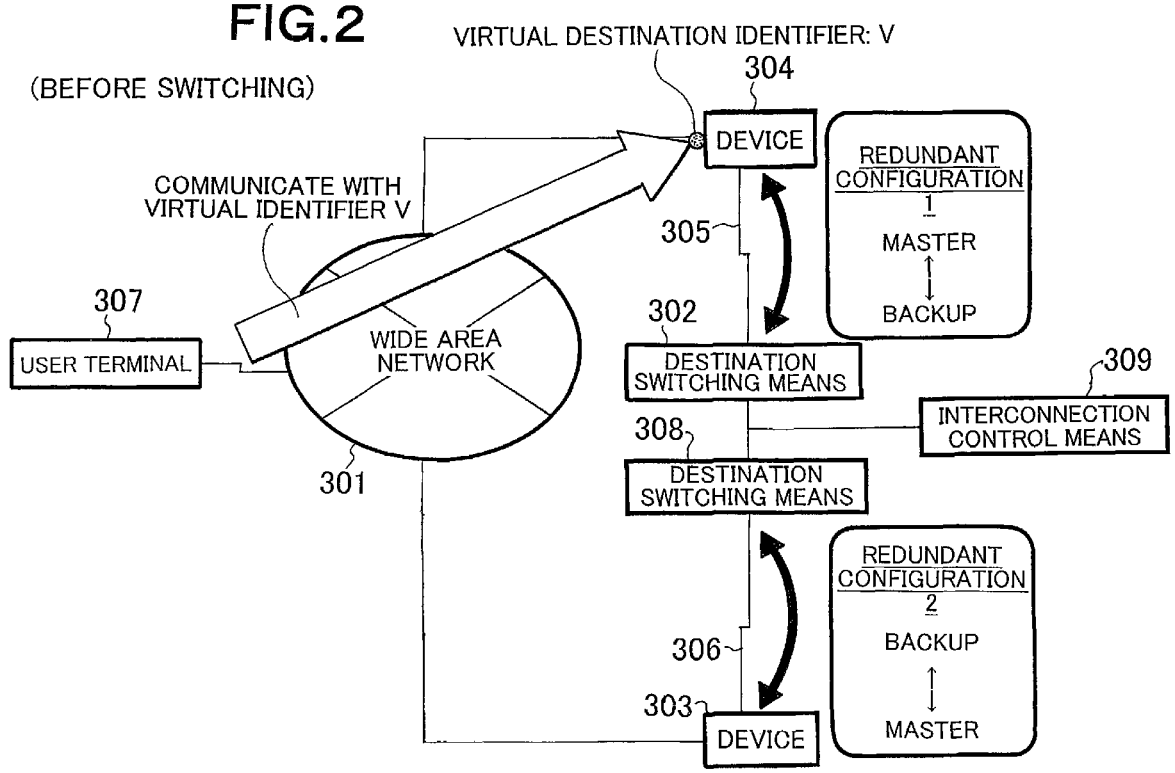
[FIG. 2] A configuration of a network system before switching
Figure 3:
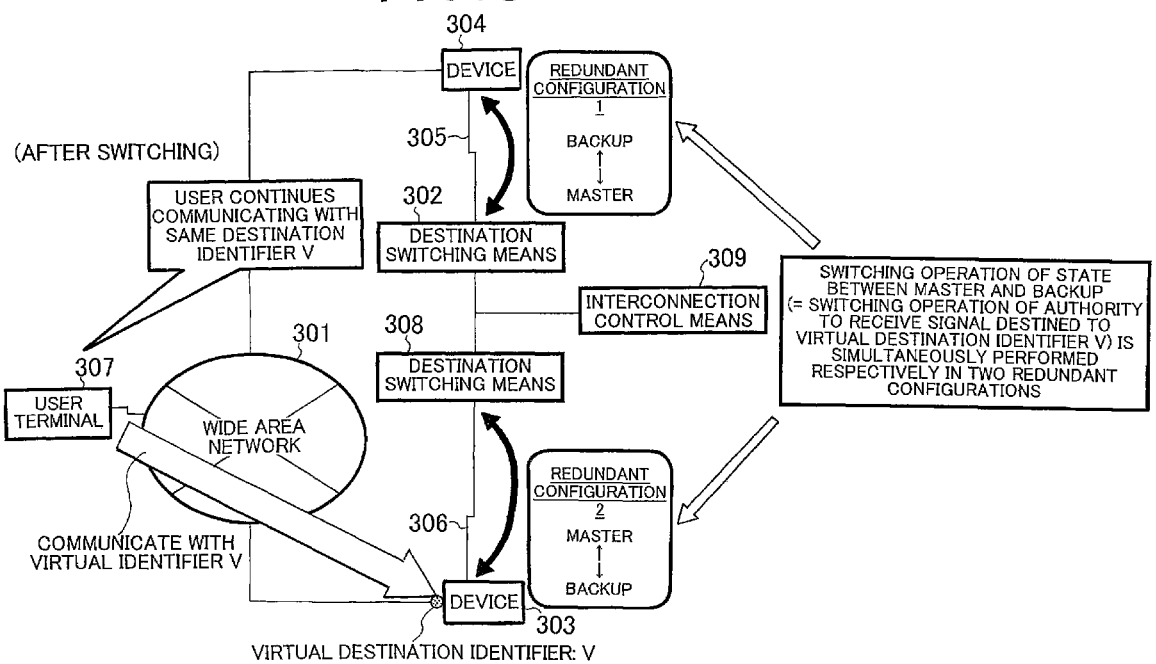
[FIG. 3] A configuration of a network system after switching

An overview of the configuration for realizing the present invention will be described with reference to FIGS. 2 and 3. FIG. 2 is a configuration of a network system before switching, and FIG. 3 is a configuration of the same after switching. A redundant configuration is established between devices 304 and 303. Under the control of a redundancy protocol, one of the devices is in an operating state (MASTER), and the other is in a standby state (BACKUP). It is assumed here that the device 304 is MASTER, and device 303 is BACKUP.

Destination switching means 302 and 308 are connected to the devices 304 and 303 through networks 305 and 306 for control. The destination switching means 302 and 308 have pseudo redundant configuration setting means, respectively. The control networks 305 and 306 differ, physically and logically, from a network 301 to which the devices 304, 303 and a user terminal 307 which communicates with the devices 304 and 303 are connected.

In the present invention, a communication between the devices 304 and 303 is not directly performed using a redundancy protocol, but the destination switching means 302 and 308 provided between the devices 304 and 303 act as redundancy devices to establish redundant configurations between the device 304 and destination switching means 302 and between the device 303 and destination switching means 308. Then, switching operations of a MASTER device made in the redundant configurations between the device 304 and destination switching means 302 and between the device 303 and destination switching means 308 are associated with each other by an association control means 309 to thereby virtually perform a switching of a MASTER device between the devices 304 and 303. A switching between MASTER and BACKUP corresponds to a switching of authority to receive a signal to be sent to a virtual destination identifier V. This allows a user who performs a communication with a device on a network to change an actual destination while communicating with the same destination identifier.

In the above connection configuration, when an unintended switching of MASTER is generated in one redundant configuration, the switching is not allowed to be reflected on the other redundant configuration, thereby avoiding an unintended destination switching.

Hereinafter, a description will be given of unintended destination switching which is automatically generated. In a redundant configuration using a redundancy protocol, a switching between devices in an operating state and in a standby state is caused by the following two conditions: (1) Case where a device in an operating state goes down due to failures and, accordingly, a device in a standby state automatically shifts to an operating state; (2) Case where a device in an operating state is intentionally shifted to a standby state by an instruction from an administrator and, accordingly, the authority to enter an operating state is transferred to a device in a standby state. Thus, in the case where a redundancy protocol is used as a destination switching technique, a device in a standby state may detect the breakdown of a device in an operating state for some reasons to automatically shift to an operating state.

Figure 5:
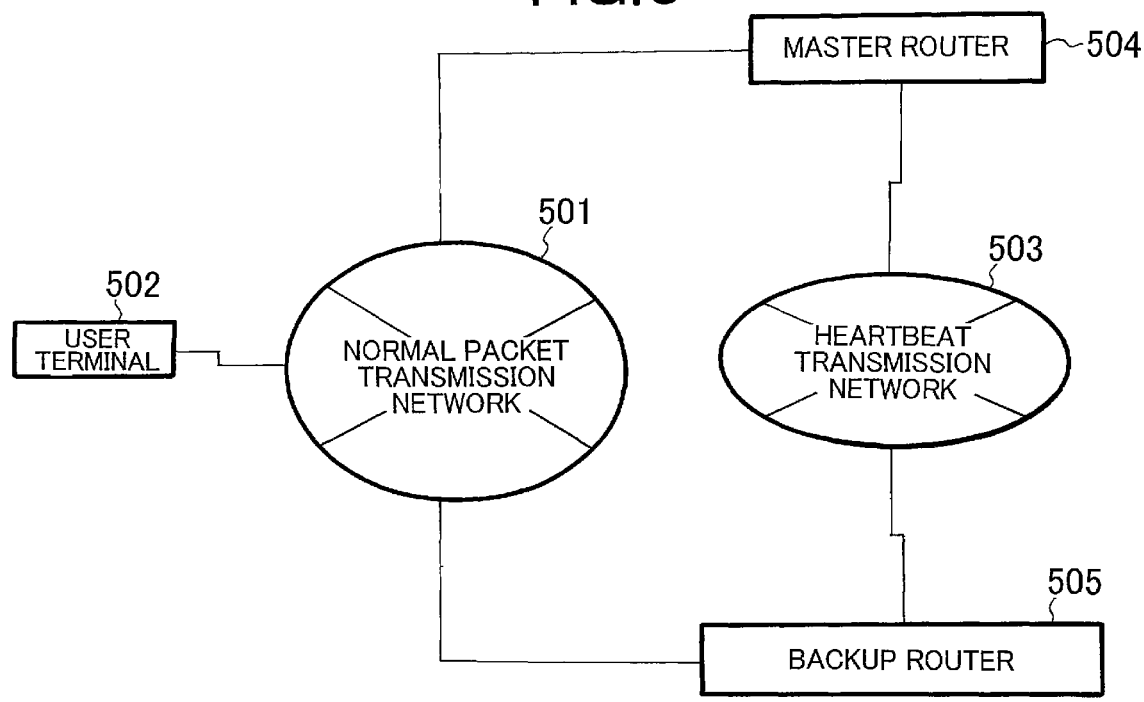
[FIG. 5] A view for explaining a conventional switching method between connection network devices

For example, assume that a redundant configuration is implemented between two routers and a redundant protocol is used in this configuration, as shown in FIG. 5. A network 503 is made specially for transmitting the heartbeat of a MASTER router 504 to a BACKUP router 505. In this case, even when there is no trouble in a communication between a normal packet transmission network 501 and MASTER router 504 and a communication between a user terminal 502 and MASTER router 504, simply when the heartbeat from the MASTER router 504 does not reach the BACKUP router 505 due to failures occurring in the dedicated network 503, the BACKUP router 505 determines that some trouble occurs in the MASTER router 504 and switches its own state to MASTER. That is, the BACKUP router 505 starts receiving a packet destined for a shared virtual destination identifier. Consequently, a plurality of the same destination identifiers exist on the normal packet transmission network, disrupting packet transmission.

In particular, in the case where a physical distance between the two devices is large, this problem is serious. Because a probability of occurrence of troubles in the network for transmission of the heartbeat becomes increasingly higher in proportion to the distance between the two devices. It can be considered that the network is made redundant in order to increase the resistance to failures. However, the larger the distance between the two devices, the larger the physical scale of the network to be made redundant becomes, resulting an increase in cost in most cases.

Therefore, in the case where the redundancy protocol is used as a destination switching technique, it is necessary to eliminate the automatic switching as much as possible and specialize in the intentional switching. Accordingly, a mechanism for preventing the automatic destination switching as much as possible is required while the redundancy protocol which is a standard is used. As described above, in the present invention, when an unintended switching of MASTER is generated in one redundant configuration, the switching is not allowed to be reflected on the other redundant configuration, thereby avoiding an unintended destination switching.

Figure 4:
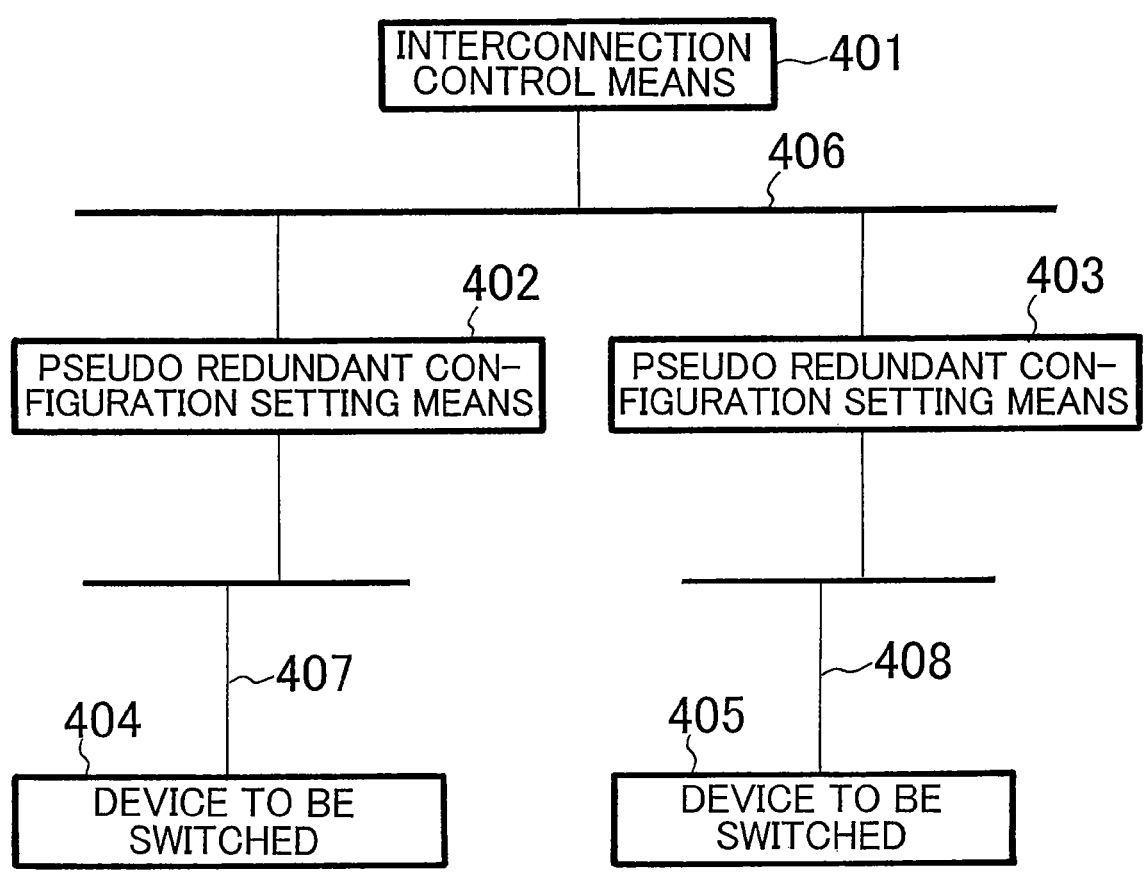
[FIG. 4] A block diagram showing a configuration of a network system according to the present invention
Figure 6:
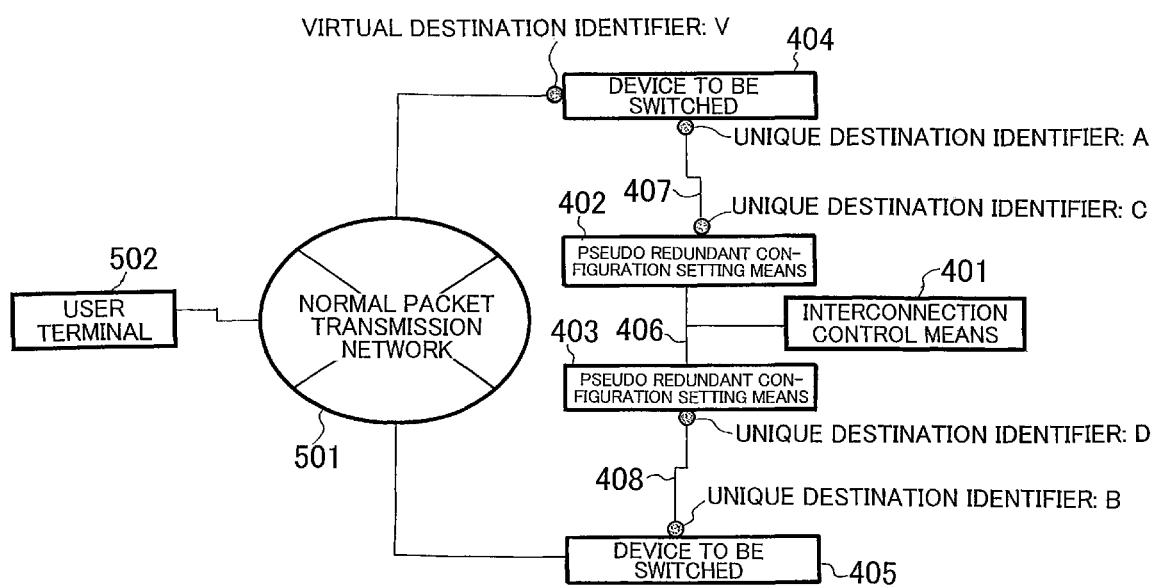
[FIG. 6] A view showing a configuration of a network system including a user terminal according to the present invention

A preferred embodiment for practicing the present invention will be described with reference to FIGS. 4 and 6. FIG. 4 is a block diagram showing a configuration of a network system according to the present invention. FIG. 6 is the network system including a user terminal. It is assumed here that a pseudo redundant configuration setting means is directly connected to a device to be switched and association control means, respectively.

Devices 404 and 405 to be switched are devices for providing some services to a user. The devices 404 and 405 to be switched are connected respectively to a user terminal 502 through a network 501. The user terminal 502 communicates with a device having a destination identifier V. The devices 404 and 405 to be switched implement a redundancy protocol and a redundant configuration is established between them. That is, a device in MASTER state receives a signal destined to the destination identifier V and continues issuing a heartbeat. On the other hand, a device in BACKUP state continues waiting for the heartbeat from MASTER and switches its own state to MASTER when it has not received the heartbeat for a given time.

In the present embodiment, the devices 404 and 405 to be switched are respectively connected to the pseudo redundant configuration setting means 402 and 403 through networks 407 and 408 which differ, physically and logically, from a network 501 through which the devices 404 and 405 are connected to the user terminal 502. A signal such as a heartbeat which is based on a redundancy protocol is transmitted through the networks 407 and 408. A communication using the redundancy protocol is not directly performed between the devices 404 and 405 to be switched. That is, the devices 404 and 405 to be switched directly communicate respectively with the pseudo redundant configuration setting means 402 and 403 using the redundancy protocol.

An association control means 401 is connected to the pseudo redundant configuration setting means 404 and 403 through a dedicated network 406 and issues a destination switching request respectively to the pseudo redundant configuration setting means 404 and 403. A switching control signal is input to the association control means through an input means operated by an administrator or by a detection unit (serves as an input means) that has detected a system failure. In response to the switching control signal, the association control means 401 transmits the destination switching request.

A description will next be given of operation in the present embodiment. It is assumed here that the device 404 to be switched is MASTER, and device 405 to be switched is BACKUP (and vice versa).

Firstly, at the normal time, the device 404 (MASTER) to be switched transmits a heartbeat based on a redundancy protocol to a BACKUP device though the network 407 at a given time interval (it is assumed that the length of the time interval is previously set in the redundant configuration setting time and is known by the device 404 to be switched and pseudo redundant configuration setting means 402). At this time, the device 404 to be switched recognizes that a BACKUP device is the pseudo redundant configuration setting means 402 and transmits the heartbeat to a unique destination identifier C of the pseudo redundant configuration setting means 402.

Even when the pseudo redundant configuration setting means 402 receives the heartbeat from the device 404 to be switched, it ignores the heartbeat and discards it.

The pseudo redundant configuration setting means 403 issues a heartbeat at a given interval (it is assumed that the length of the time interval is previously set in the redundant configuration setting time and is known by the device 405 to be switched and pseudo redundant configuration setting means 403) to a unique destination identifier B corresponding to the device 405 (BACKUP) to be switched.

The device 405 (BACKUP) to be switched waits for the heartbeat from MASTER (i.e., pseudo redundant configuration setting means 403). Upon receiving the heartbeat from the pseudo redundant configuration setting means 403, the device 405 recognizes that the heartbeat is from MASTER and sets back a timer for time-out to 0.

In the manner as described above, the state where the device 404 to be switched operates as MASTER and device 405 to be switched operates as BACKUP is maintained at the normal time.

Operation at the destination switching time will next be described with reference to FIG. 1. An administrator uses a not shown input means to operate the association control means 401 to give a trigger for a destination switching. The association control means 401 instructs the pseudo redundant configuration setting means (A) 402 and (B) 403 to start the destination switching operation through the network 406 (steps S101 and S104).

Upon receiving the destination switching operation start instruction, the pseudo redundant configuration setting means 402 uses a redundancy protocol to transmit, through the network 407, information for prompting the device (A) 404 to be switched to shift to BACKUP state to the device (A) 404 (step S102). This information depends on the redundancy protocol. For example, in the VRRP, priority is set in the devices in a redundant relationship. When a heartbeat (VRRP packet) from a device having higher priority than the device 404 to be switched, the device 404 which is in MASTER state switches its own state to BACKUP state. Utilizing this operation, the pseudo redundant configuration setting means 402 acts as a device having higher propriety than the device 404 to be switched and issues a VRRP packet with higher priority.

Upon receiving the information for prompting the shift to BACKUP state, the device 404 to be switched switches its own state to BACKUP state (step S103).

Upon receiving the destination switching operation start instruction, the pseudo redundant configuration setting means 403 uses a redundancy protocol to transmit, through the network 408, information for prompting the device (B) 405 to be switched to shift to MASTER state to the device (B) 405 (step S105). This information depends on the redundancy protocol. For example, in the VRRP, when a device receives a VRRP packet with priority of 0, it switches its own state from BACKUP state to MASTER state. Thus, the pseudo redundant configuration setting means 403 transmits a VRRP packet with priority of 0 to the device 405 to be switched.

Upon receiving the information for prompting the shift to MASTER, the device 405 to be switched switches its own state from BACKUP state to MASTER state (step S106).

The execution order of "process A" in FIG. 1 (steps S101, S102, S103) for the device 404 to be switched and "process B" in FIG. 1 (steps S104, S105, S106) for the device 405 to be switched is not important. Further, the two processes A and B may be executed simultaneously.

In the operation described above, the devices 404 and 405 to be switched do not directly exchange a heartbeat between them, but operate as if a redundant configuration were directly established between them when there is an intentional instruction of a switching operation.

Next, operation at the time when failures occur in the network for exchanging a heartbeat or in MASTER itself will be described.

Firstly, a case where failures occur in a MASTER device will be described. Also in the following description, it is assumed that the device 404 to be switched is MASTER and device 405 to be switched is BACKUP. That is, it is assumed that failures occur in the device 404 to be changed.

In this case, while a heartbeat, which is transmitted from the device 404 to be switched to the pseudo redundant configuration setting means 402 at a given time interval, is stopped, the pseudo redundant configuration setting means 402 does nothing in particular. The device 405 to be switched continues receiving a heartbeat from the pseudo redundant configuration setting means 403 and, therefore, performs its normal operation. As a result, it is possible to avoid unintended occurrence of a switching operation.

Next, cases where failures occur in the networks 406, 407, and 408 will be described.

Firstly, it is assumed that failures occur in the network 406. In this case, communications among the association control means 401, pseudo redundant configuration setting means 402, and pseudo redundant configuration setting means 403 are lost, preventing a switching operation of MASTER and BACKUP from being started. On the other hand, communications between the pseudo redundant configuration setting means 402 and device 404 to be switched and between the pseudo redundant configuration setting means 403 and device 405 to be switched are assured, so that exchange of the heartbeat is not interrupted. Therefore, it is possible to avoid unintended occurrence of a switching of a destination, which has conventionally occurred in the case where the heartbeat is exchanged through a dedicated line or the like (see FIG. 5).

Secondly, it is assumed that failures occur in the network 407. In this case, a communication is lost between the pseudo redundant configuration setting means 402 and the device 404 (MASTER) to be switched and, accordingly, the pseudo redundant configuration setting means 402 cannot receive a heartbeat from the device 404 to be switched. In this state, however, the pseudo redundant configuration setting means 402 does nothing in particular. Generally, in the redundancy protocol, the operating states of devices other than a device in MASTER state are ignored. Thus, even if the device 404 to be switched detects the breakdown of a device to which a heartbeat is destined, it does nothing in particular. The network 408 is normal to allow the device 405 to be switched to continue receiving a heartbeat. Therefore, the device 405 to be switched performs its normal operation, with the result that it is possible to avoid unintended occurrence of a switching operation.

Finally, it is assumed that failures occur in the network 408. In this case, a communication between the pseudo redundant configuration setting means 403 and the device 405 (BACKUP) to be switched is lost. Accordingly, after a given time has elapsed, the device 405 to be switched determines that failures occur in MASTER and switches its own state to MASTER. Thus, an unintended switching operation occurs.

As described above, the unintended switching operation occurs only in the case where failures occur in the network 408 on BACKUP side. Therefore, it is only necessary to set a redundant configuration for improvement of reliability only in the network 407 on main side and network 408 on BACKUP side, in consideration that main and BACKUP are switched occasionally. In the case where the distance between the two devices is large, the physical scale of the network 406 is made great and the physical scales of the networks 407 and 408 are made small relative to the network 406, thereby reducing cost for a redundant configuration.

EXAMPLE 1

Figure 7:
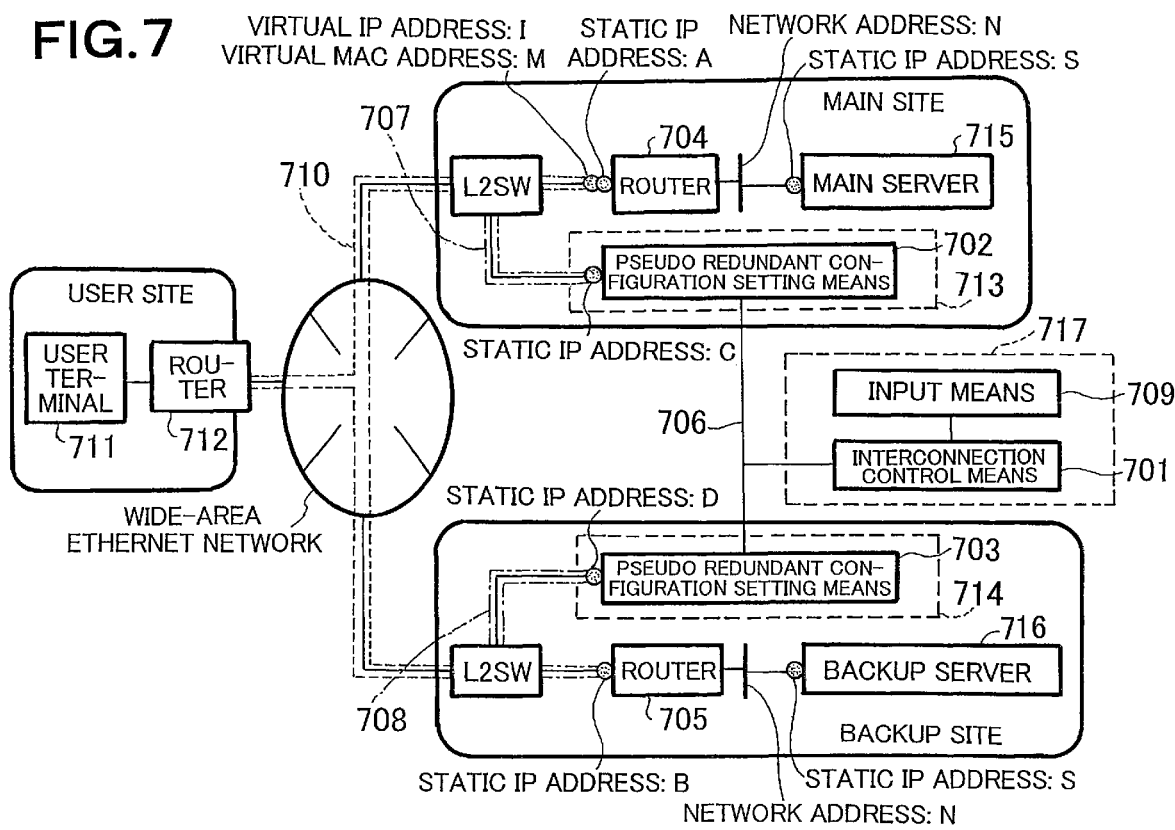
[FIG. 7] A view showing a first example of a network system and a switching method between network connection devices according to the present invention

An example of the present invention will be described with reference to FIG. 7.

A main server 715 and a backup server 716 are provided in a main site and backup site, respectively. Application programs can be run on the respective servers 715 and 716. The main site and backup site are located away from each other. When a TCP connection between a user terminal 711 and the main server 715 (backup server 716) through an edge router 704 (705) provided in the main site (backup site), the user terminal 711 can utilize the application programs.

A VRRP, which is a standard redundancy protocol, is implemented in the router 704 and 705 respectively. The priority value set in the respective routers is 100 and heartbeat transmission interval set therein is 1 second. A combination of the main server 715 and router 704 constitute one device to be switched, and a combination of the backup server 716 and router 705 constitute the other device to be switched.

Figure 8:
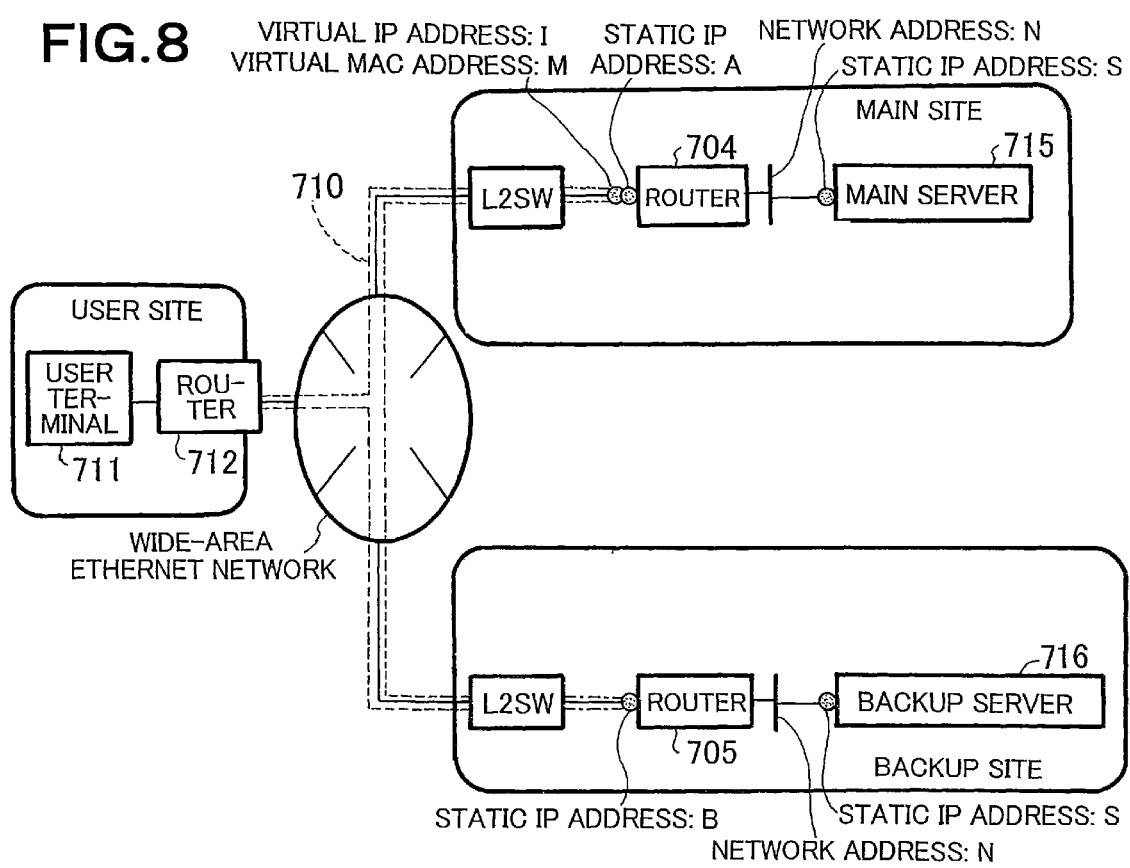
[FIG. 8] A connection diagram showing a configuration that allows a user to utilize application programs

FIG. 8 is a connection diagram showing a configuration that allows a user to utilize application programs.

Figure 9:
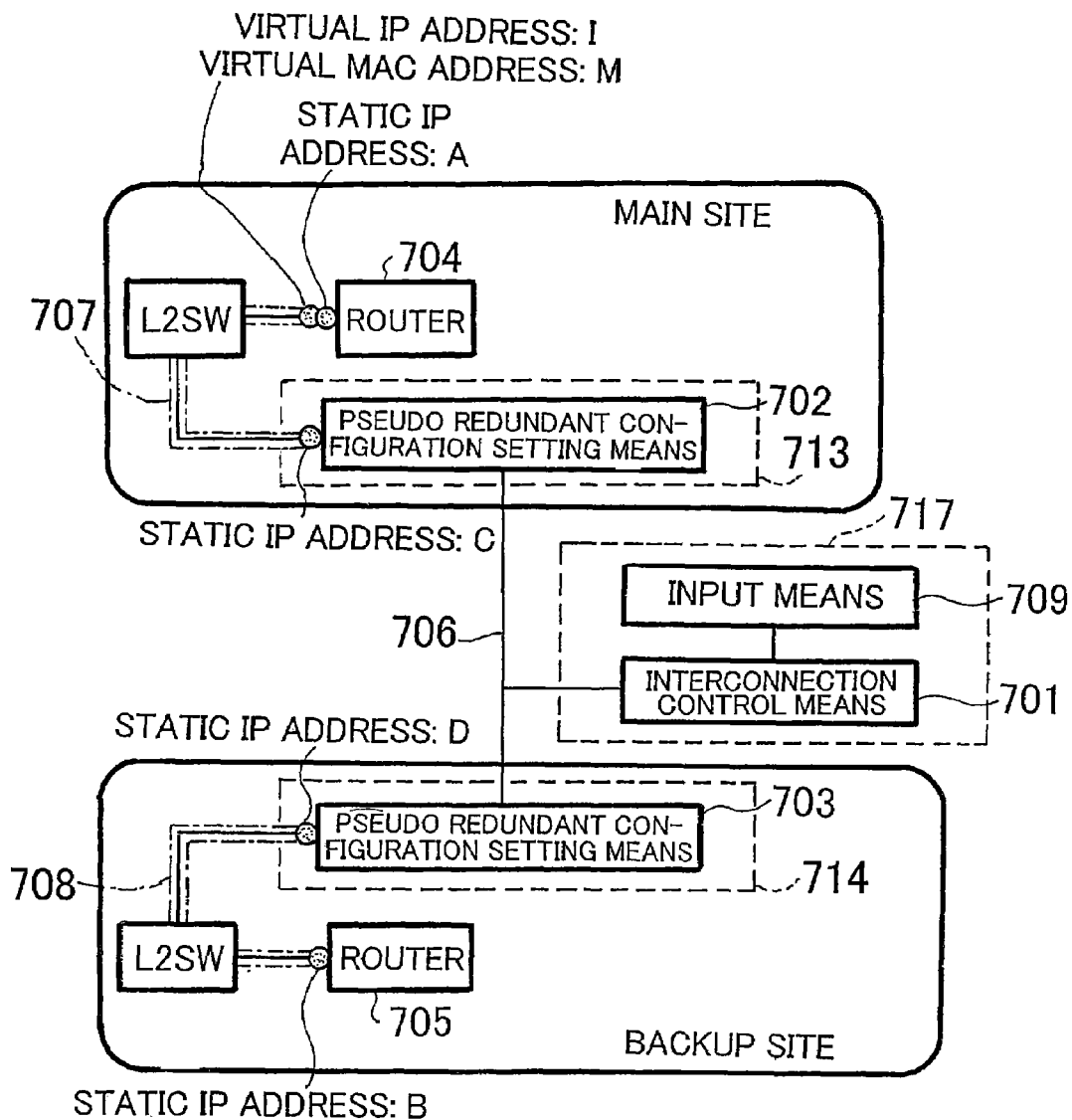
[FIG. 9] A connection diagram for a destination switching control according to the present invention

FIG. 9 is a connection diagram for a destination switching control according to the present invention.

In the present example, an input means 709 and association control means 701 are implemented as an association control unit 717, and a pseudo redundant configuration setting means 702 and 703 are implemented in destination switching units 713 and 714 respectively. The association control unit 717 is realized by, e.g., a personal computer and has, as an input means, input devices including a keyboard and buttons which are directly depressed by an administrator, GUI buttons on a display of the computer, and the like. The destination switching unit may be constituted by only the pseudo redundant configuration setting means or, as shown in Example 2 to be described later, constituted by the pseudo redundant configuration setting means and a component other than the pseudo redundant configuration setting means, such as an L2SW. When the pseudo redundant configuration setting means is constituted as hardware, it can be realized as an independent unit or, as shown in Example 2 to be described later, a component such as a circuit or board to be integrated in the destination switching unit. When the pseudo redundant configuration setting means is constituted as software, it is realized by storing, in a memory such as ROM, a program (or a program product), which has already been described using FIGS. 1 to 4 and FIG. 6, describing the function of the pseudo redundant configuration setting means and executing the program together with a CPU and a rewritable memory that stores data required for information processing.

In the present example, the destination switching unit 713 is provided in the main site in which the main server 715 is located and is connected to a layer 2 switch (L2SW) and association control means 701 through different communication paths. The L2SW is also provided in the main site and located between the router 704 and a wide area network such as Wide-Area Ethernet™.

Similarly, in the present example, the destination switching unit 714 is provided in the backup site in which the backup server 716 is located and is connected to the L2SW and association control means 701 through different communication paths. The L2SW is also provided in the main site and located between the router 704 and a wide area network such as Wide-Area Ethernet™.

Hereinafter, operations at the normal time, at the destination switching time, and at the time of network failure will be described. It is assumed here that the router 407 in the main site is MASTER, and router 705 in the backup site is BACKUP (and vice versa).

Figure 10:
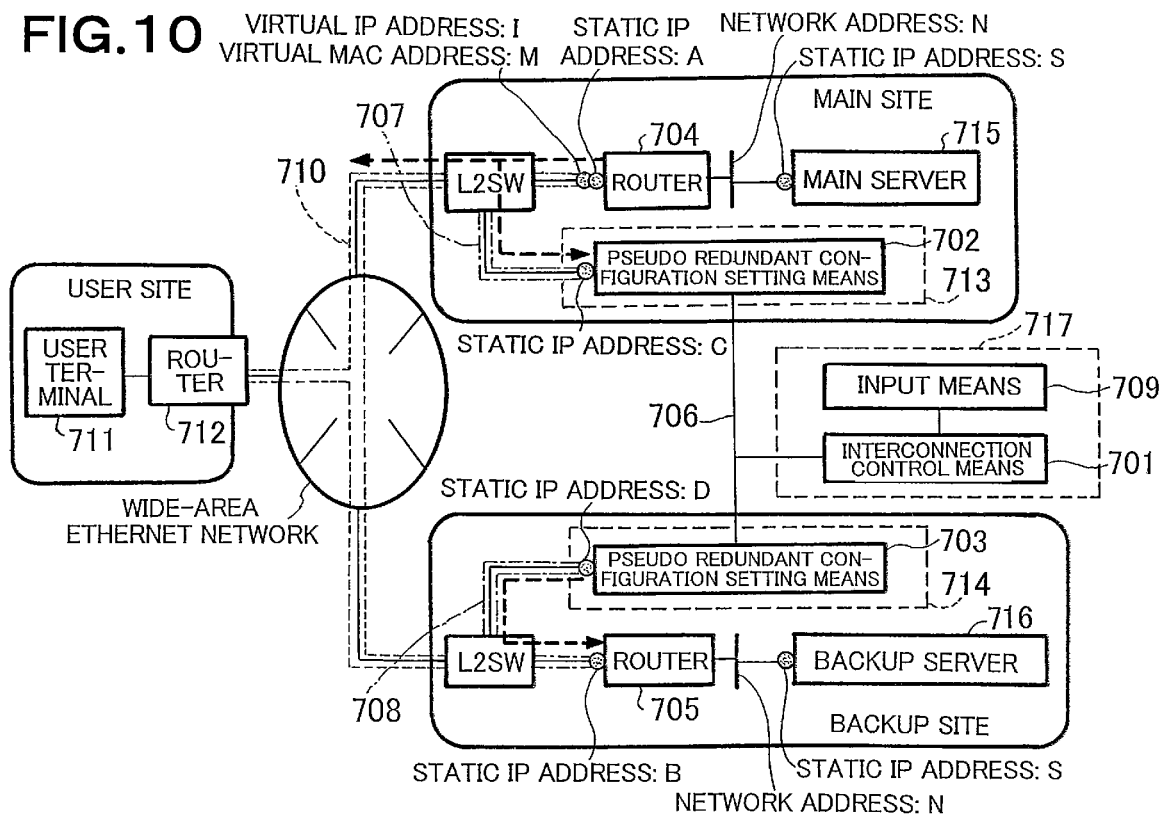
[FIG. 10] A view showing normal operation of the network system according to the present invention

Firstly, normal operation will be described with reference to FIG. 10. At the normal time, the main server 715 is in an operating state and an application program runs. The backup server 716 is in a standby state, and a certain time is required for shifting the backup server to an operating state. A user establishes a TCP connection with a static IP address s of the main server 715 to communicate with the server 715 to thereby utilize the application program.

The router 704, which is MASTER, transmits a heartbeat of VRRP (VRRP packet having a priority value of 255) to the destination switching unit 713 at a given time interval (1 sec, in this case) through a VLAN A for heartbeat. The pseudo redundant configuration setting means 702 of the destination switching unit 713 receives the heartbeat and discards it without processing it further. Note that, in the network shown in FIG. 10, a port-base VLAN is used to constitute a VLANs 707 and 708 for heartbeat and a VLAN 710 for user and, accordingly, there is a possibility that the VRRP packet from the destination switching unit 713 reaches a router 712 of the user site and router 705 in the backup site. However, a set of static IP addresses of devices that constitute a redundant configuration is described in the VRRP packet (in this case, a set of static IP addresses a and c is described). Thus, when a VRRP packet with a set of static IP addresses that differs from that recognized by the router 712 or router 705 is transmitted thereto, the router 712 or 715 discards the packet.

On the other hand, the pseudo redundant configuration setting means 703 of the destination switching unit 714 transmits a heartbeat of VRRP (VRRP packet having a priority value of 255) to the router 705 being in BACKUP state at a given time interval (although the time interval is set to 1 sec in this case, it is not always necessary to set the same value as the heartbeat interval set in a redundant configuration between the pseudo redundant configuration setting means 702 and router 704) through a VLAN 708 for heartbeat.

The router 705 continues waiting for the heartbeat from the destination switching unit 714. The router 705 has a count-up timer and switches its own state to MASTER when it has not received the heartbeat for a given time (the time uniquely determined based on the heartbeat interval). Normally, the router 705 receives the heartbeat from the pseudo redundant configuration setting means 703 within the set given time and seta back the time to 0.

Figure 11:
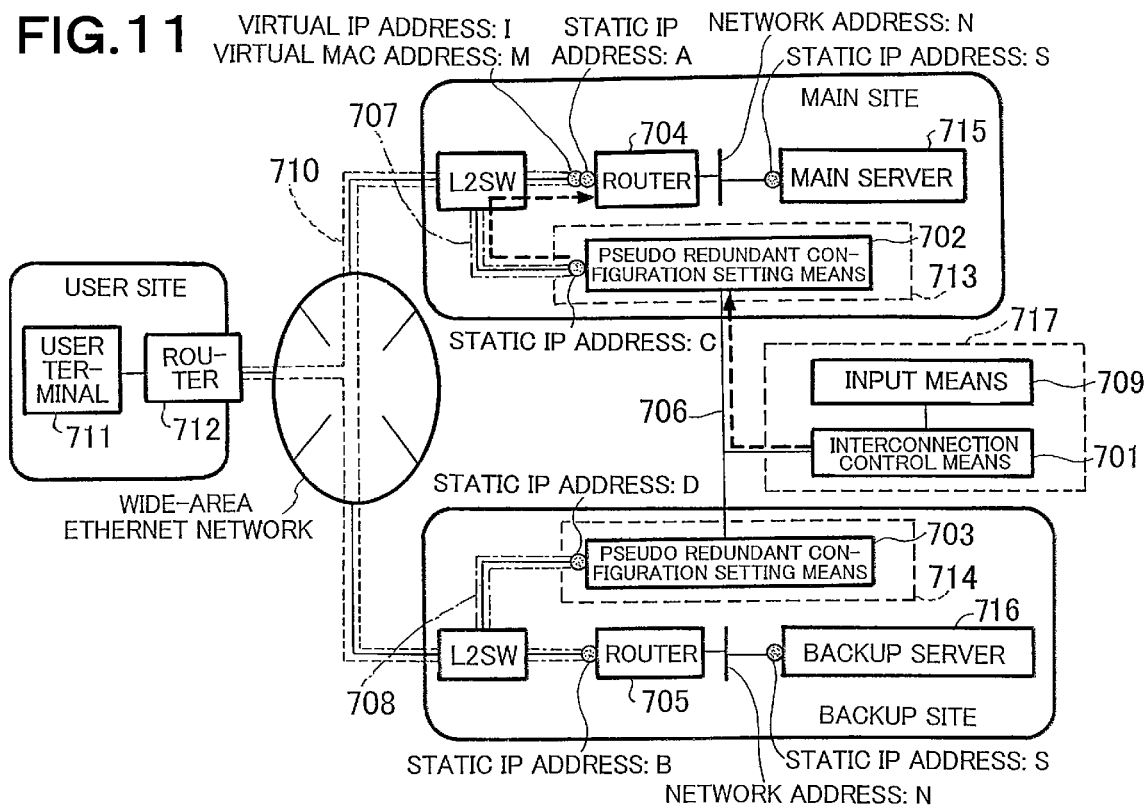
[FIG. 11] A view for explaining operation at destination switching time
Figure 12:
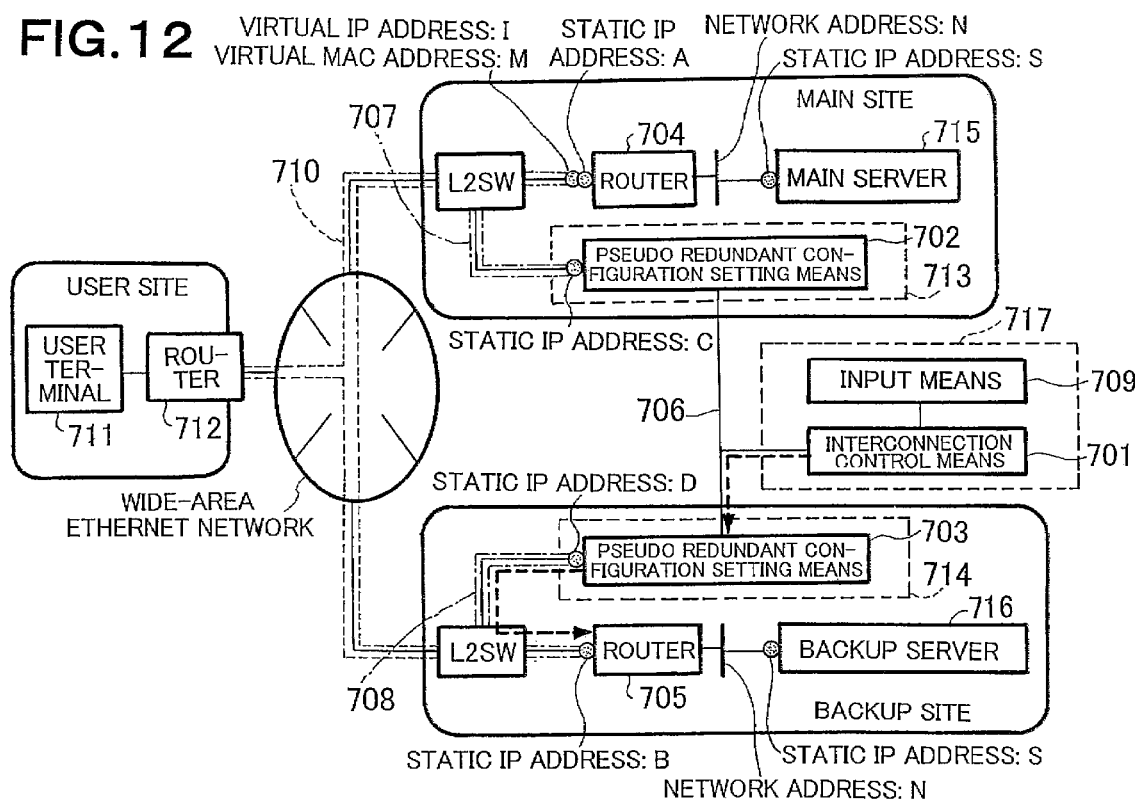
[FIG. 12] A view for explaining operation at destination switching time
Figure 13:
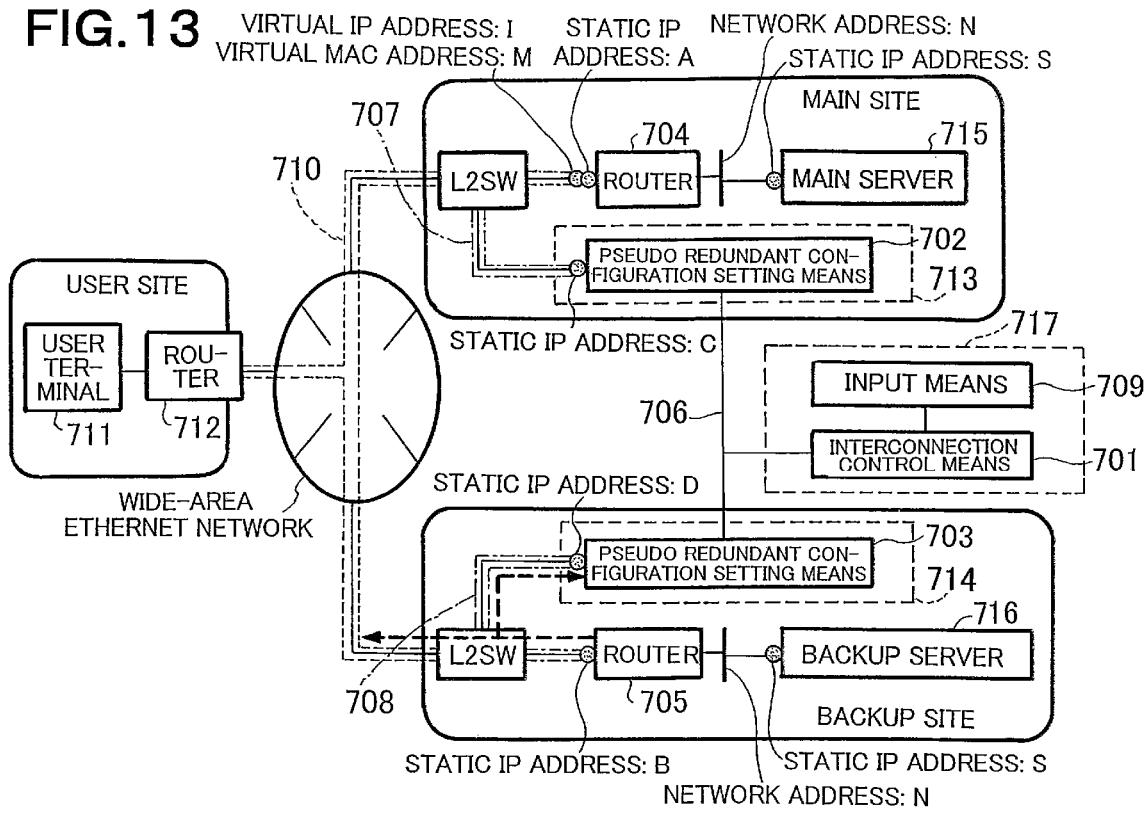
[FIG. 13] A view for explaining operation at destination switching time

Operation at the destination switching time will next be described (FIGS. 11 to 13).

When switching the destination of the user from the main server 715 of the main site to the backup server 716 of the backup site, an administrator uses the input means 709 of the association control unit 717 to instruct the association control means 701 to execute a destination switching operation. Upon receiving the instruction from the input means 709, the association control means 701 instructs, through the control network 706, the pseudo redundant configuration setting means 702 and 703 to start the destination switching operation (denoted by arrows shown in FIGS. 11 and 12).

Upon receiving the destination switching operation start instruction, the pseudo redundant configuration setting means 702 transmits, through the VLAN 707 for heartbeat, a VRRP packet having a priority value of 254 to the router 704 (denoted by an arrow shown in FIG. 11) (although there is a possibility that this VRRP packet is transmitted to the Wide-Area Ethernet network, a problem will not be caused, as has been described above).

Upon receiving the VRRP packet having priority of 254 from the pseudo redundant configuration setting means 702, the router 704 recognizes that a router having a higher priority value than the priority value (=100) of its own has appear and switches its own state to BACKUP.

On the other hand, upon receiving the destination switching operation start instruction, the pseudo redundant configuration setting means 703 transmits, through the VLAN 708 for heartbeat, a VRRP packet having a priority value of 0 to the router 705 (denoted by an arrow shown in FIG. 12). When MASTER transmits the VRRP packet having a priority value of 0, it means that MASTER abandons its MASTER authority.

Upon receiving the VRRP packet of priority value of 0, the router 705 switches its own state to MASTER to obtain the authority to receive a packet destined to a virtual IP address and virtual MAC address.

Note that, in the configuration according to the present example, the destination of a packet can be switched at high-speed. That is, when entering MASTER state, the router 705 transmits an ARP request for inquiring the MAC address of the counterpart router with which a redundant configuration is established using the broadcast capability of Ethernet™ (denoted by an arrow shown in FIG. 13). At this time, virtual MAC address: m is set as source address. Since the network for heartbeat is a port-base VLAN, this broadcast frame is also transmitted to the wide area network such as Wide-Area Ethernet™ network and the L2SW that constitutes the VLAN for user. Upon receiving the broadcast frame, the L2SW recognizes ahead of which port the router having the virtual MAC address: m exists and rewrites the content of a MAC address table related to the virtual MAC address: m. This allows a fact that the owner of the virtual MAC address is switched from the router 704 to router 705 to be spread to the wide area network such as Wide-Area Ethernet™ immediately. As a result, it is possible for a user machine or a router R0 to switch, at high-speed, the destination of a packet destined to the virtual IP address: i and virtual MAC address: m to an actual destination without actively changing its destination.

When the router 705 enters Master state, a network having the same network address as that of the network to which the main server 715 belongs is connected to the router 705. Since the backup server 716 having IP address s belongs to the same network as the router, a packet transmitted from the user destined to IP address s reaches the backup server 716 through the router 705. Therefore, a packet distend to IP address s, which reaches the main server 715 in a state where the router 704 is MASTER and router 705 is BACKUP, is transmitted to the backup server 716 in a state where the router 704 is BACKUP and router 705 is MASTER. As a result, it is possible for the user to switch the actual destination from the main server 715 to the backup server 716 which belongs to different subnet from the main server 715 while connecting to the same IP address.

Operation at the time of network failure will next be described. Failures can occur at the following five locations. A first failure location is the VLAN 710 for user in the wide area network such as Wide-Area Ethernet™ network; a second failure location is the VLAN 707 for heartbeat connecting the destination switching unit 713 and router 704; a third failure location is the VLAN 708 for heartbeat connecting the destination switching unit 714 and router 705; a fourth failure location is the control network 706 connecting the association control means 701, destination switching unit 713, and destination switching unit 714; and a fifth failure location is the router 704 operating as MASTER.

Hereinafter, operation to be performed in the case where failures occur in the above first failure location (VLAN 710 for user) will be described.

It is assumed that failures occur in the VLAN 710 for user in the wide area network such as Wide-Area Ethernet™ network and communication breakdown occurs. In this case, although a user cannot utilize an application program, Master state is not switched between the routers 704 and 705 since there is no problem in communications between the router 705 and destination switching unit 713 and between the router 705 and destination switching unit 714. On the other hand, if the routers 704 and 705 directly exchange a heartbeat between them on the same network as the VLAN for user and failures occur in this network, a heartbeat form MASTER side cannot reach BACKUP side, with the result that MASTER state is automatically switched.

Operations to be performed in the case where failures occur in the above second to fifth failure locations are as has been described in the above embodiment. That is, when failures occur in the second failure location (VLAN 707 for heartbeat) or in the fifth failure location (router 704), a communication between the destination switching unit 713 and router 704 is lost with the result that the pseudo redundant configuration setting means 702 of the destination switching unit 713 cannot receive a heartbeat from the router 704. However, the redundant configuration setting means 402 does nothing in particular and, since the VLAN 708 for heartbeat is normal and the router 705 continues receiving a heartbeat, MASTER state is not switched between the routers 704 and 705.

Even if failures occur in the fourth failure location (control network 706), MASTER state is not switched between the routers 704 and 705 since the VLANs 407 and 408 for heartbeat are normal.

On the other hand, when failures occur in the third failure location (VLAN 708 for heartbeat), the router 705 cannot receive a heartbeat from the pseudo redundant configuration setting means 703 of the destination switching unit 714 with the result that the router 705 is switched to MASTER.

As described above, the same problem as that encountered in the conventional system occurs only in the case where failures occur in the VLAN 708 for heartbeat. Therefore, it is only necessary to set a redundant configuration for improvement of reliability only in the VLAN 707 for heartbeat on the main side and VLAN 708 for heartbeat on backup side, in consideration that MASTER and BACKUP are switched occasionally.

In this example, the second and third failure locations are situated within the main site and backup site respectively. Thus, it is possible to realize a technique for improvement of reliability, such as a redundancy technique, at comparatively low cost.

While the input means serves as an input device that an administrator intentionally operates in the present example, it is possible to configure the input means as a detection unit for detecting the failures of the router and main server. In this case, it is possible to configure the association control means as a unit that transmits a destination switching operation start instruction to the pseudo redundant configuration setting means when receiving a detection signal representing occurrence of failures from the input means as the detection unit. For example, in the case where the input means is configured as a detection unit that detects failures in a router, the association control means transmits the destination switching operation start instruction to the pseudo redundant configuration setting means only when the detection unit detects failures in the router; whereas the association control means does not issue the destination switching operation start instruction even when the detection unit detects failures in the VLAN for user connected to the main server, the VLAN for heartbeat on the main side, or control network, thereby making it possible to avoid unintended occurrence of an automatic switching operation.

The input means and association control means may integrally be formed with each other (for example, the input means is configured as buttons on a GUI (Graphical User Interface) of a personal computer (PC), and the association control means is configured as a program on a PC), or they may be provided separately from each other. For example, in the case where the input means is configured as a detection unit for detecting failures in a router and transmitting a detection signal to the association control means, the input means may be provided in both the main site and backup site in some cases in consideration of the switching between MASTER and BACKUP.

Figure 16:
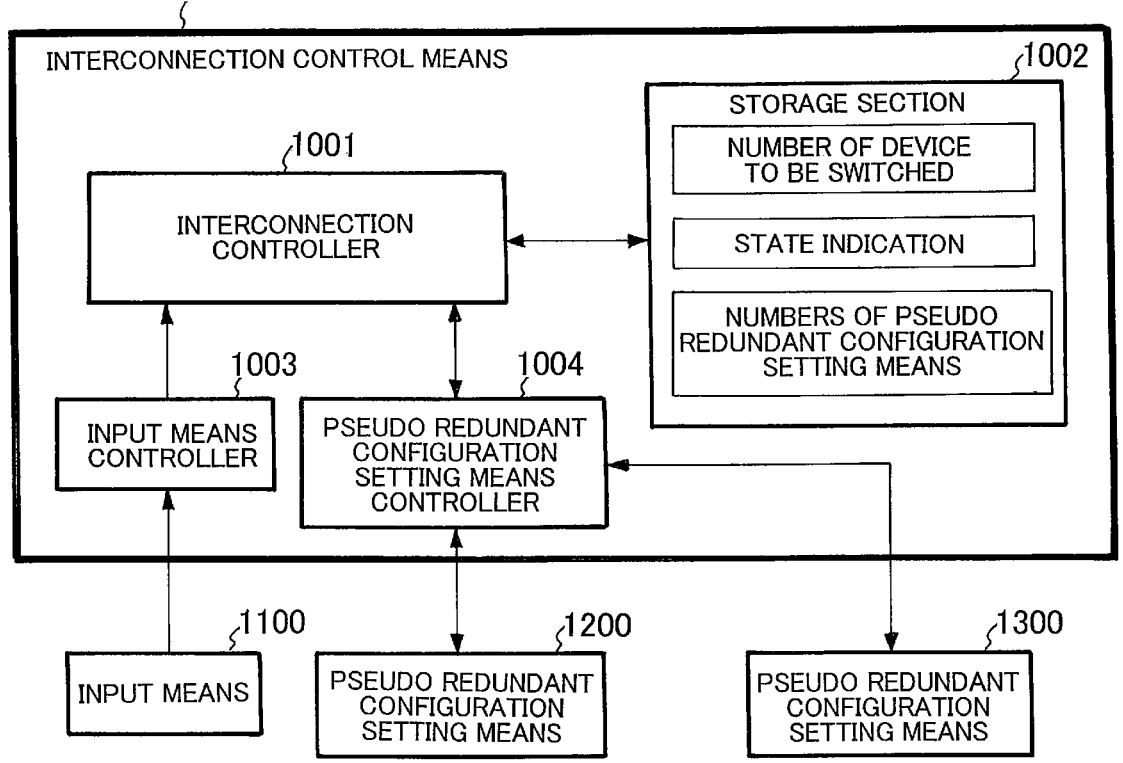
[FIG. 16] A block diagram showing the function of an association control means

FIG. 16 is a block diagram showing the function of the association control means, and FIG. 18 is a flowchart showing the operation of the association control means. A storage section 1002 stores numbers of pseudo redundant configuration setting means 1200 and 1300 connected thereto, numbers (numbers of devices to be switched) of a main server 715 and backup server 716, and a state indication specifying whether the main server 715 and backup server 716 are being in an operating state or standby state. These information are transmitted from the respective pseudo redundant configuration setting means to a pseudo redundant configuration setting means controller 1004 and stored in the storage section 1002 through an association controller 1001. Accordingly, when a state change (e.g., switching from standby state to operating state) occurs, the state indication is correspondingly updated. Upon receiving a switching request (switching control signal) for the devices to be switched from an input means 1100 (steps S201, S202), an input means controller 1003 outputs the switching request to the association controller 1001. The association controller 1001 then accesses the storage section 1002 to check states (operating state or standby state) of the devices to be switched, which are connected thereto through the pseudo redundant configuration setting means (step S203) and transmits, through the pseudo redundant configuration setting means controller 1004, a switching instruction to both the pseudo redundant configuration setting means 1200 connected to the device to be switched which is being in an operating state and pseudo redundant configuration setting means 1300 connected to the device to be switched which is being in a standby state (step S204). The above operation can be realized by executing a program describing the content of the above operation, as described later.

While one association control means 701 is provided for both the pseudo redundant configuration setting means 702 connected to the main server 715 and pseudo redundant configuration setting means 703 connected to the backup server 716 in the present example, the one association control means 701 can perform association control for three or more pseudo redundant configuration setting means. For example, it is assumed that the association control means is provided for a system including a plurality of main servers and a plurality of backup servers. In this case, by storing, in the storage section 1002, numbers of all pseudo redundant configuration setting means connected to the association control means, and, numbers of and state (MAIN or BACKUP) of servers connected to the respective pseudo redundant configuration setting means, it is possible for the association control means to confirm a state of the server for which a switching request is made, to select the server to be shifted to an operating state from a plurality of servers being in a standby state, to specify the pseudo redundant configuration setting means connected to the server for which the switching request is made and pseudo redundant configuration setting means connected to the server selected as one to be shifted to an operating state, and transmit a switching instruction to these pseudo redundant configuration setting means to thereby realize association control operation. Note that, when it is certain that the number of the pseudo redundant configuration setting means controlled by the association control means is two and that a main server is connected to one of the two pseudo redundant configuration setting means and a backup server is connected to the other, it is not necessary to provide the storage section 1002 and it is only necessary for the association controller 1001 to transmit a switching instruction to the pseudo redundant configuration setting means 1200 and 1300 when receiving the switching request from the input means.

Figure 17:
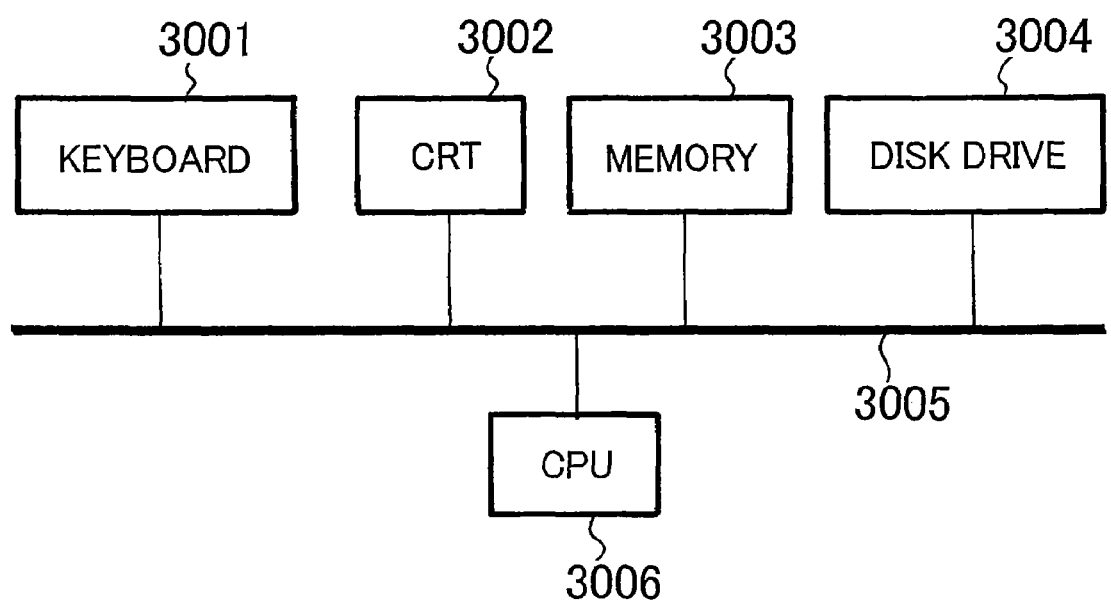
[FIG. 17] A view schematically showing a configuration of a personal computer

In the present example, controllers 1001, 1003, and 1004 of the association control means are implemented as a program (or program product) on a personal computer (PC) and perform operation as shown in FIG. 18. For example, as shown in FIG. 17, a disk drive 3004 such as a hard disk stores the program, a memory 3003 such as a DRAM stores information including numbers of devices to be switched, state indication, and numbers of the pseudo redundant configuration setting means, and a CPU 3006 executes the program. A key board 3001 serves as an input means. A display 3002 such as a CRT or LCD (represented as CRT in the drawing) displays an information processing state or result of switching of servers. Reference numeral 3005 denotes a bus such as a data bus. Note that the function of the association control means may be realized by a software or hardware configuration.

When a user uses, in the present example, a VRRP as a redundancy protocol in order to change destinations between two routers located away from each other for the purpose of performing a switching operation between servers that the user connects to through a wide area network such as Wide-Area Ethernet™ network without changing the IP address of the destination, destination of a packet transmitted from the user is quickly changed to a target destination, in terms of results. This is because that the VRRP broadcasts, immediately after a given device enters MASTER state, an ARP request for inquiring the MAC address of the other device in a redundant configuration, and when the ARP request is broadcasted to the wide area network such as Wide-Area Ethernet™ network, a change in a set of an virtual IP address which is a destination identifier of MASTER device and virtual MAC address is reflected on the Wide-Area Ethernet network side at high-speed.

EXAMPLE 2

Figure 14:
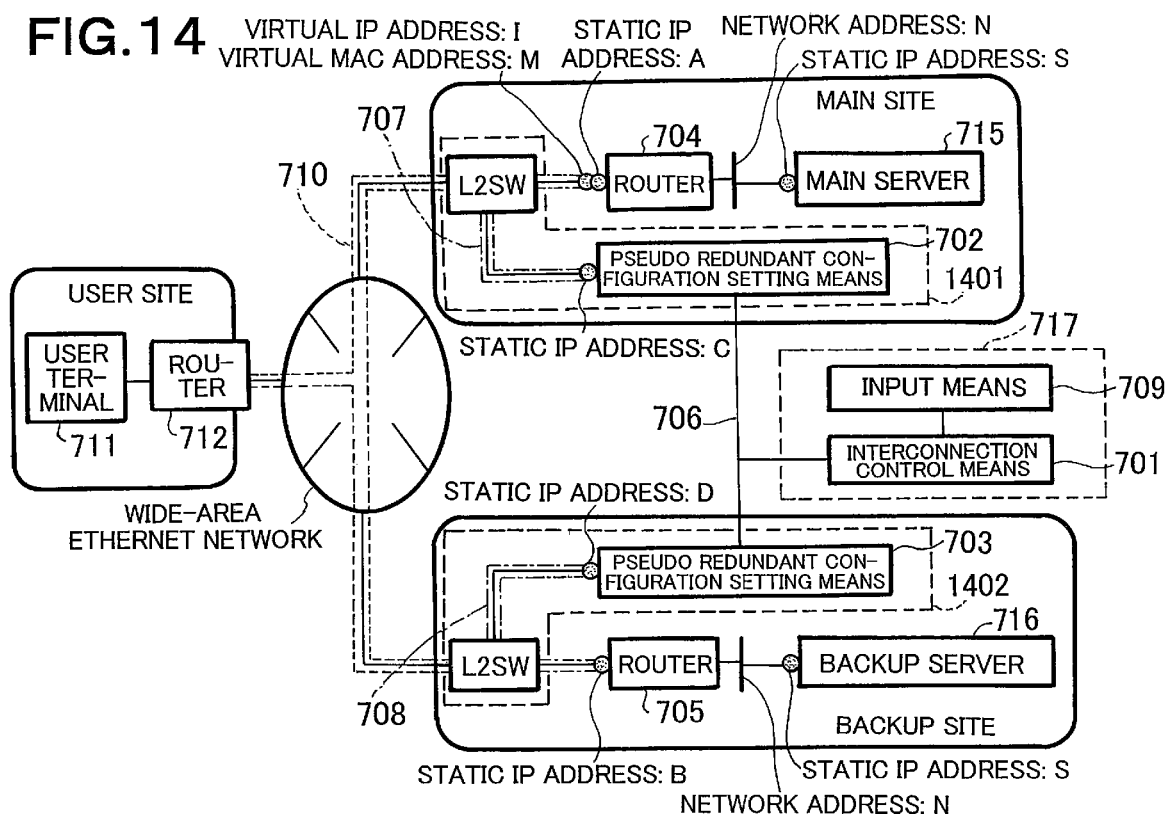
[FIG. 14] A view showing a second example of the network system according to the present invention

A second example of the present invention will next be described with reference to FIG. 14. In the configuration shown in FIG. 14, the pseudo redundant configuration setting means 702 and L2SW of the main site shown in FIG. 7 constitute a destination switching unit 1401, and the pseudo redundant configuration setting means 703 and L2SW of the backup site shown in FIG. 7 constitute a destination switching unit 1402. The function of this second example is the same as that of the first example.

EXAMPLE 3

While one pseudo redundant configuration setting means is provided for each of the devices to be switched included in the main site and backup site in the above first and second examples of the present invention, there is also available a configuration in which a plurality of pseudo redundant configuration setting means are provided for one device to be switched.

Figure 15:
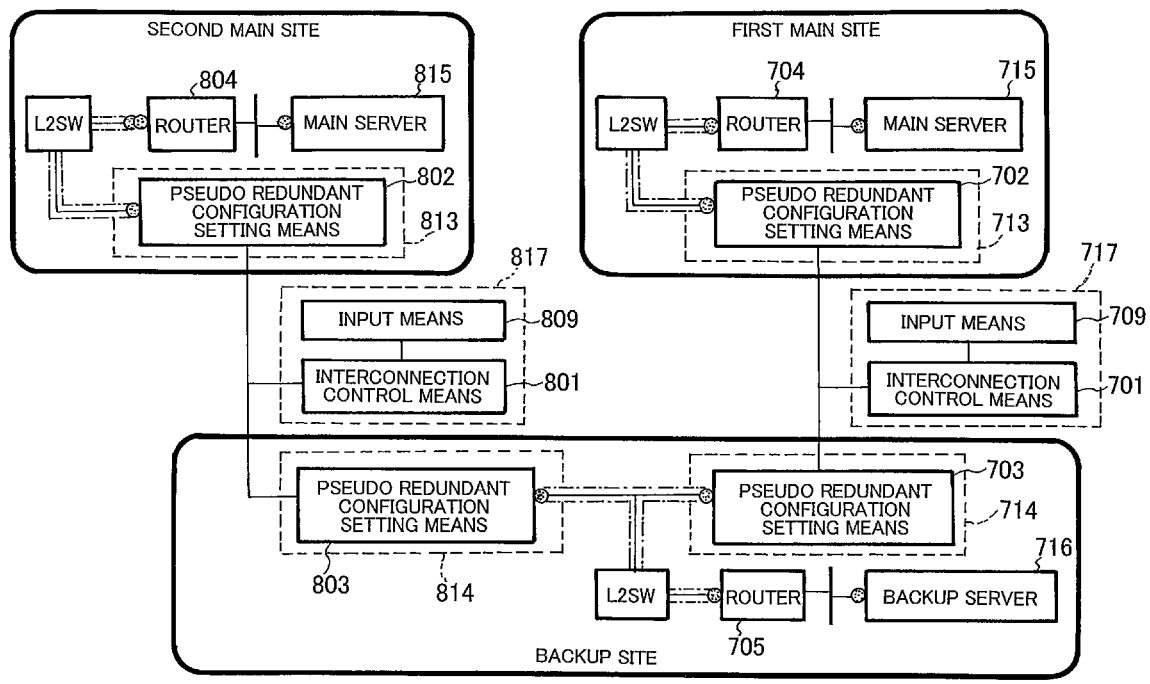
[FIG. 15] A block diagram showing a third example of the network system according to the present invention

FIG. 15 is a block diagram showing a network system according to a third example of the present invention. In this network system, only one backup server is used for backup of two main servers. In this case, two pseudo redundant configuration setting means 703 and 803 are provided for the backup server 716.

In FIG. 15, configurations of the first main site and association control means 717 are the same as those of FIG. 1. A second main site includes a main server 815, a router 804, a layer 2 switch (L2SW), and a destination switching unit 813 including a pseudo redundant configuration setting means 802. The pseudo redundant configuration setting means 802 is connected to an association control unit including an input means 809 and association control means 801. A destination switching unit 814 including a pseudo redundant configuration setting means 803 is provided in the backup site and is connected to the L2SW.

The invention claimed is:

1. A method of switching between network connection devices provided in a network system, the network system including: a plurality of devices to be switched connected to each other through a network; a plurality of pseudo redundant configuration setting means, each of which or several of which are connected respectively to one device to be switched and which perform a communication using a redundancy protocol with respective devices to be switched; and association control means connected to the plurality of pseudo redundant configuration setting means, wherein
- when at least one of the plurality of devices to be switched is being in a standby state and this standby state needs to be maintained, the pseudo redundant configuration setting means connected at least to one device to be switched issues a signal for maintaining a standby state to the device to be switched being in a standby state,
- when the plurality of devices to be switched are switched between a standby state and operating state, the association control means transmits a switching instruction for switching between a standby state and operating state to the pseudo redundant configuration setting means connected to the device to be switched being in a standby state and pseudo redundant configuration setting means connected to the device to be switched being in an operating state,
- the pseudo redundant configuration setting means connected to the device to be switched being in a standby state transmits, in response to the switching instruction, information for switching to an operating state to the device to be switched being in a standby state, and
- the pseudo redundant configuration setting means connected to the device to be switched being in an operating state transmits, in response to the switching instruction, information for switching to a standby state to the device to be switched being in an operating state.

2. The method of switching between network connection devices according to claim 1, wherein
- the device to be switched includes a router, and
- a communication using a redundancy protocol is performed between the router and the pseudo redundant configuration setting means.

3. A network system comprising:
- a plurality of devices to be switched connected to each other through a network;
- a plurality of pseudo redundant configuration setting means, each of which or several of which are connected respectively to one device to be switched and which perform a communication using a redundancy protocol with respective devices to be switched; and
- association control means connected to the plurality of pseudo redundant configuration setting means, wherein
- when a device to be switched connected to the pseudo redundant configuration setting means is being in a standby state and this standby state needs to be maintained, the pseudo redundant configuration setting means issues a signal for maintaining a standby state to the device to be switched,
- when devices to be switched are switched between a standby state and operating state, the association control means transmits a switching instruction for switching between a standby state and operating state to the pseudo redundant configuration setting means connected to the device to be switched being in a standby state and pseudo redundant configuration setting means connected to the device to be switched being in an operating state,
- the pseudo redundant configuration setting means connected to the device to be switched being in a standby state transmits, in response to the switching instruction, information for switching to an operating state to the device to be switched being in a standby state, and
- the pseudo redundant configuration setting means connected to the device to be switched being in an operating state transmits, in response to the switching instruction, information for switching to a standby state to the device to be switched being in an operating state.

4. The network system according to claim 3, wherein
- the device to be switched includes a router, and
- a communication using a redundancy protocol is performed between the router and the pseudo redundant configuration setting means.

5. An association control unit used in a network system including: a plurality of devices to be switched connected to each other through a network; and a plurality of pseudo redundant configuration setting means, each of which or several of which are connected respectively to one device to be switched, which perform a communication using a redundancy protocol with respective devices to be switched, and which issues a signal for maintaining a standby state to a device to be switched when the device to be switched connected to the pseudo redundant configuration setting means is being in a standby state and this standby state needs to be maintained, the association control means being connected to the plurality of pseudo redundant configuration setting means, wherein
- when receiving a control signal for switching between an operating state and standby state of the devices to be switched, the association control unit transmits a switching instruction for switching between a standby state and operating state to the pseudo redundant configuration setting means connected to the device to be switched being in a standby state and pseudo redundant configuration setting means connected to the device to be switched being in an operating state.

6. A program allowing a computer for association control to execute processing:
- the computer being used in a network system including: a plurality of devices to be switched connected to each other through a network; and a plurality of pseudo redundant configuration setting means, each of which or several of which are connected respectively to one device to be switched, which perform a communication using a redundancy protocol with respective devices to be switched, and which issues a signal for maintaining a standby state to a device to be switched when the device to be switched connected to the pseudo redundant configuration setting means is being in a standby state and this standby state needs to be maintained, and
- the computer being connected to the plurality of pseudo redundant configuration setting means,
- the processing comprising: transmitting, when receiving a control signal for switching between an operating state and standby state of the devices to be switched, a switching instruction for switching between a standby state and operating state to the pseudo redundant configuration setting means connected to the device to be switched being in a standby state and pseudo redundant configuration setting means connected to the device to be switched being in an operating state based on information related to the plurality of devices to be switched and plurality of pseudo redundant configuration setting means which are stored in a storage section of the computer.

* * * * *